April 23, 1968 A. J. GRINER 3,379,299
APPARATUS FOR CONVEYING AND DIVERGING ROWS OF ARTICLES
Original Filed Dec. 31, 1963 2 Sheets-Sheet 2

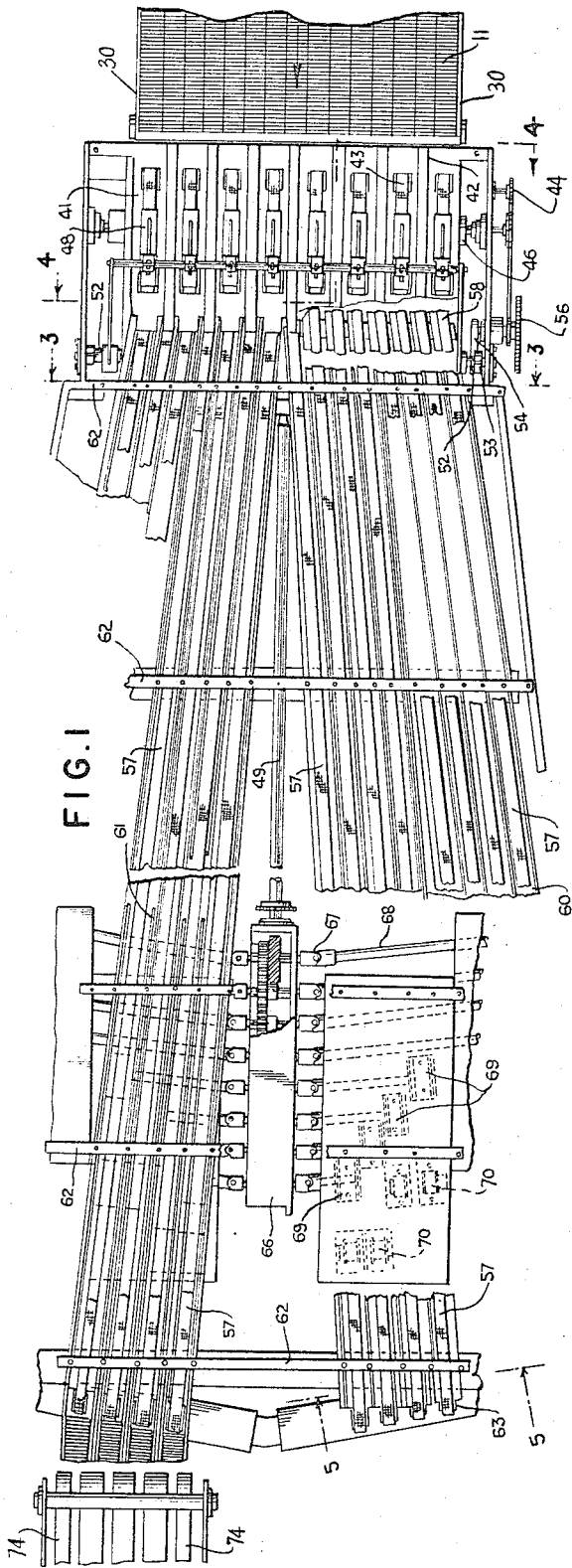

INVENTOR.
ARTHUR J. GRINER
BY Bauer & Seymour
ATTORNEYS

United States Patent Office 3,379,299  
Patented Apr. 23, 1968

3,379,299  
APPARATUS FOR CONVEYING AND DIVERGING ROWS OF ARTICLES  
Arthur J. Griner, Wyckoff, N.J., assignor to National Biscuit Company, New York, N.Y., a corporation of New Jersey  
Original application Dec. 31, 1963, Ser. No. 334,796. Divided and this application Dec. 21, 1966, Ser. No. 603,487  
9 Claims. (Cl. 198—30)

ABSTRACT OF THE DISCLOSURE

Apparatus comprising conveyor means for supplying parallel contacting rows of articles, such as biscuits stacked on edge, to a plurality of single-row conveyors which receive adjacent rows at different levels and deliver the same as laterally separated rows at a common level, each said conveyor comprising an endless belt supported primarily by idler pulleys in line therewith and driven by a drive pulley in line therewith, and common means for driving said drive pulleys.

---

This application is a division of my pending parent application Ser. No. 334,796, now Patent No. 3,283,060, filed Dec. 31, 1963, for "Method and Apparatus for Handling Tablet-Like Articles Such as Biscuits."

The present invention relates to the automatic handling of relatively flat articles, such as biscuit in the form of crackers, cookies and the like, and more particularly to apparatus for continuously conveying columns of such articles while causing contacting columns to diverge from one another.

An object of the invention is to provide means for automatically advancing and handling baked goods and comparable products between a continuously producing bake oven or other production apparatus and packaging machinery, leaving only occasional adjustments to be made by attendants in charge of the equipment.

By way of example, the invention is particularly suited to and is illustrated and described herein in connection with the handling of crackers or biscuit baked in a continuous line oven wherein the biscuit are baked and emerge on a continuous moving belt conveyor in the form of large sheets which are longitudinally and transversely scored to divide the same into biscuit-size areas. The scored sheets issuing from the oven are first broken along the transverse scores to form transverse strips of unseparated biscuit which are shingled or stacked on edge and conveyed through a conditioning zone. While the shingled or stacked strips are continuously conveyed broadside, they are broken by suitable means along the longitudinal scores into unit size biscuit or panels, thus forming substantially contacting side-by-side rows or columns of stacked panels. In practice, there may be as many as 16 or more rows thus formed, depending upon the width of the individual crackers and the width of the oven band. The contacting adjacent rows are then caused by novel apparatus to diverge or fan out laterally so that the distance between adjacent rows is progressively increased. If desired, selected groups or rows may be caused to diverge still further, whereby the contents of several rows may be later converged and fed to each of several wrapping machines.

It is, then, an object of the present invention to provide novel apparatus adapted for use in automatically handling baked goods, such as crackers, and other generally flat articles in accordance with a novel method whereby the same travel continuously from mass production equipment to packaging equipment therefor.

Another object is to provide novel apparatus whereby plural rows of articles moving in parallel adjacent paths may be caused to diverge.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views;

FIG. 1 is a plan view, with parts broken away or removed in the interest of clarity, illustrating apparatus contemplated by the invention for diverging parallel rows or groups of rows of advancing articles;

FIG. 2 is a side elevation view of the apparatus of FIG. 1, with parts broken away or removed in the interest of clarity;

Figure 3:
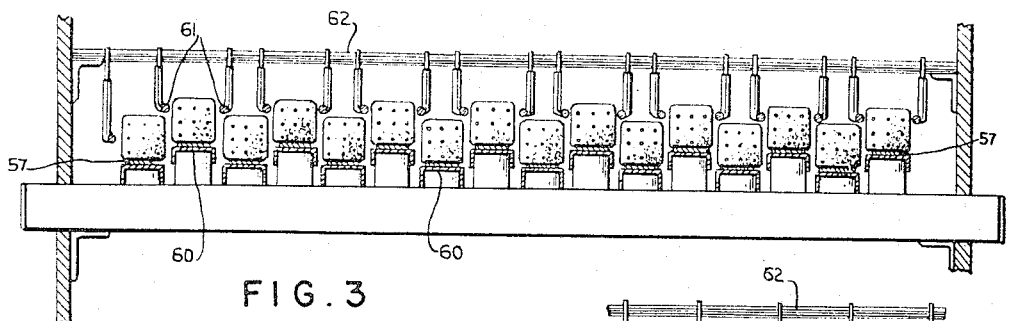
FIG. 3 is a transverse elevation view, partly in section of a portion of the diverger mechanism, the view being taken substantially on line 3—3 of FIG. 1 near the receiving end.

The apparatus contemplated by the present invention is constructed to receive a plurality of side-by-side contacting rows or columns, say 16, of crackers or similar articles on edge from a continuously moving endless conveyor belt 30. In order to condition a plurality of such columns or rows of crackers for subsequent automatic consolidation into a single continuously moving column to facilitate packaging with a minimum of equipment, it is necessary first to spread or diverge the adjacent rows. To accomplish this, a diverging conveyor is coupled with the discharge end of conveyor 30. The entry end of this novel diverger equipment comprises a plate or bridge 41 for receiving the rows of crackers from conveyor 30. The plate has spaced ramps 42 and channels therebetween for receiving and guiding alternate rows of crackers to different levels vertically as the rows are advanced. In the illustrated embodiment, separate belt conveyors 43 are provided with the upper runs thereof riding in the channels between ramps 42 to assist in advancing the crackers across the plate 41. Each of belts 43 rides on a drive pulley 44 and a forward idler pulley 45, and the lower run thereof passes over an idler roll 46 and a take-up roll 47. The drive for belts 43 and tampers 48 to be next described may be from a driven shaft 49 (FIG. 2) and chain drive gears 50 and 51, respectively.

In view of the substantial side edge contact between crackers in adjacent rows, it is desirable to provide means for holding the crackers in line with belts 43 from being lifted by the other rows which are elevated by ramps 42. In the form shown vertically oscillating tampers 48 are provided for this purpose. The tampers are mounted on a cross bar 52 which is oscillated by a crank mechanism comprising a lever 53 pivotally connected at its lower end to a crank arm 54. The latter has an eccentric connection to a rotatable member 55 driven by chain 56. If desired, tampers 48 may be replaced by other suitable means, such as rollers resting on the alternate rows which are to remain at the lower level.

Figure 4:
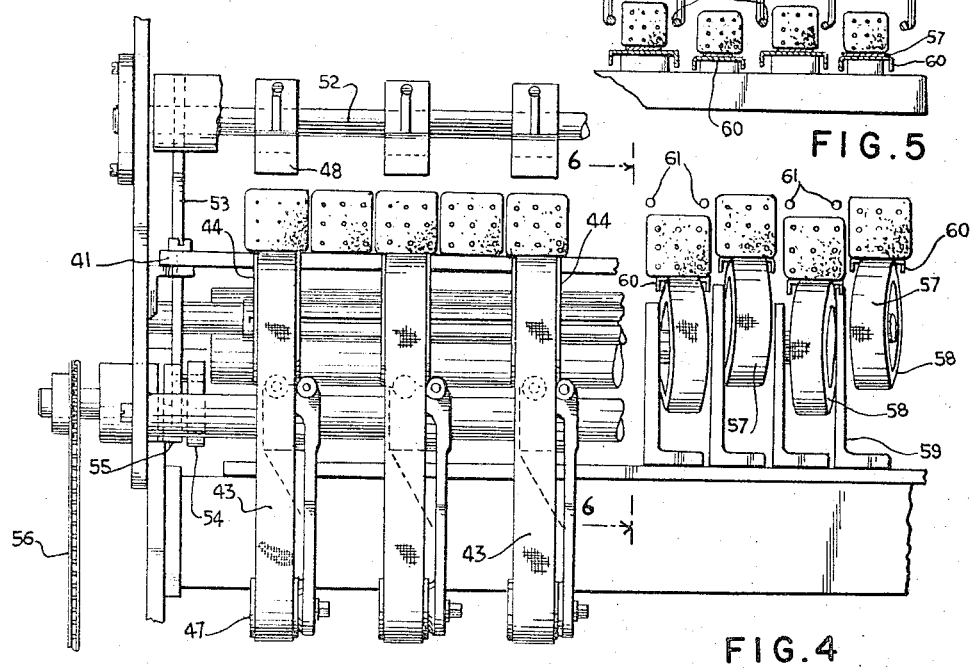
FIG. 4 is a transverse elevation view showing parts of the row diverging mechanism as viewed in two different planes, the view being taken substantially on line 4—4 of FIG. 1.

From ramps 42 and belts 43 the rows of crackers on edge pass on to single row endless belt conveyors 57 that diverge from one another as illustrated in FIG. 1. If desired, the sixteen rows of crackers may be divided into groups of four adjacent rows, for example, and these groups may be further diverged from one another along different highways to different packaging machines. At the entry end of the divider mechanism, the conveyor belts 57 pass over idler pulleys 58 which are individually mounted, such as on brackets 59 (FIG. 4), at the desired diverging angles. Adjacent pulleys 58 are mounted at different levels, as shown at the right in FIG. 4, consistent with the elevation of the rows received from ramps 42 and belts 43. The upper reaches of conveyor belts 57 ride on and are supported by channel members 60. The crackers in the elevated rows are guided by suitable side guide rods 61 which are suspended from the plurality of overhead cross bars 62. As the lower or depressed rows of crackers pass onto belts 57, they pass beneath the side guides 61 for the upper rows from ramps 42 and are suitably guided by the sides of channel supports 60 for said upper elevated rows.

Figure 5:
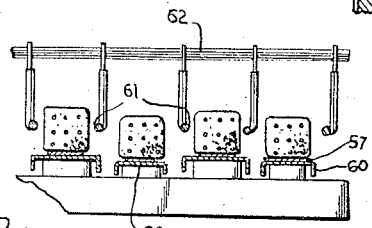
FIG. 5 is a partial elevation view similar to FIG. 3 taken in the plane of line 5—5 of FIG. 1 near the delivery end of one group of row conveyors of the diverger mechanism.

Thus, as the rows of crackers are advanced to the left, as viewed in FIGS. 1 and 2, by belts 57, the paths thereof diverge and simultaneously approach a substantially common level at the discharge end (FIGS. 5 and 6) where the conveyor belts are supported by idler pulleys 63 which are individually mounted in a manner similar to pulleys 58. As a space is created between adjacent diverging rows, the guide rods 61 are directed between the rows and any crumbs or bits of broken crackers may fall away between the diverging belt tracks or rails 60.

Figure 6:
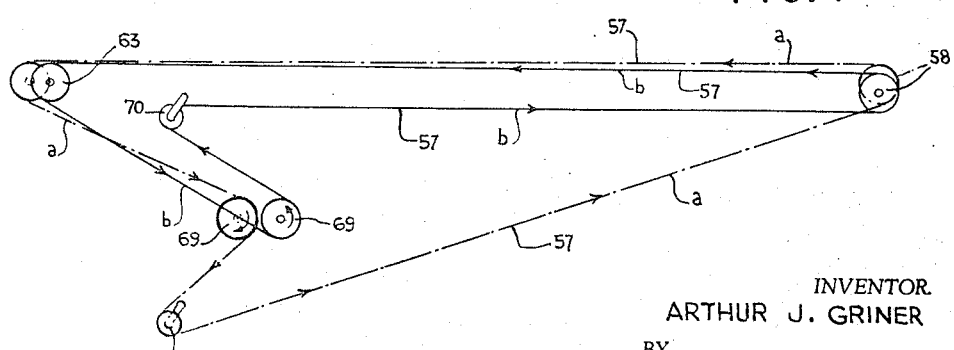
FIG. 6 is a diagram illustrating two typical adjacent row conveyor belts of the diverger mechanism as viewed from the plane of line 6—6 of FIG. 4.

In the illustrated embodiment, the belts 57 may be driven from a motor 64 or other common source of power through a series of meshing gears 65 in a gear box 66 (FIG. 2). Each drive gear 65 is drivably connected through a universal coupling 67 and a generally transverse shaft 68 to a drive pulley 69 suspended in any suitable manner from the frame. Since meshing gears 65 in the series coupled gear train rotate in opposite directions, the lower runs of alternate belts 57 are trained over drive pulleys 69 and take-up rollers 70 in the manner diagrammatically illustrated in FIG. 6 so that the upper runs of the belts will operate in the same direction. In FIG. 6 the line of travel for the belts which carry the elevated rows is illustrated at $a$ and the line of travel for the belts carrying the lower or depressed rows is illustrated at $b$.

To sum up the scheme of row or column distribution, the sixteen rows of undetached crackers entering the illustrated apparatus are separated to provide four subgroups each comprised of four rows of crackers stacked edgewise and advancing forwardly and divergently at equal speeds. At this stage, suitable clearance is obtained between adjacent rows so that the side guides may be arranged between adjacent rows. The discharge end of each group of four conveyors 57 may connect with and feed the laterally spaced rows of crackers to a unit identified as an uplift conveyor wherein guides are provided between adjacent rows, and each row is supported and advanced by two laterally spaced conveyor belts 74 which marginally underlie the supported row of crackers.

Although only a single embodiment of the article handling apparatus comprehended by the invention has been illustrated in the drawing and described in the foregoing specification, it is to be expressly understood that the invention is not thus limited. Various changes and modifications which do not depart from the spirit and scope of the invention will now be apparent to those skilled in the art.

What is claimed is:
1. Apparatus for further processing the output of a break station which includes discharge conveyor means for discharging from the break station parallel substantially contacting rows of overlapping shingled panels of freshly baked bakery goods of the class including crackers, where the break station successively receives shingled broadside-advancing strips, each scored along break lines paralleling the direction of advance at similar intervals determinative of panel width and successively breaks the advancing strips along the scored lines into the said rows of panels, the said apparatus comprising: further conveyor means for receiving, guiding and further advancing each row of shingled panels along a generally horizontal path which diverges from the path of any adjacent row, thereby separating the rows from each other, the said separation of the rows permitting such crumbs as are formed by the said breaking of the strips into panels to be dropped from the panels between the rows, and traveling support means for each row marginally underlying each of the rows which are received, guided, and further advanced by the said further conveyor means, whereby the rows are separated by an open median gap sufficiently wide to permit the pieces of shattered panels to fall therethrough out of the row.

2. Apparatus for processing parallel substantially contacting rows of articles, such as biscuits stacked on edge, comprising first conveyor means for continuously advancing said rows of articles along a generally horizontal path, means for diverting one group of alternate rows of articles to a different vertical level than the other group of remaining rows, an individual conveyor for receiving each of said rows, said conveyors for said one group of rows having the receiving ends thereof at a different level than the receiving ends of said conveyors for said other groups of rows, said individual conveyors being mounted to diverge toward and to resume a substantially common vertical level at the delivery ends thereof, and means for applying downward pressure to alternate rows as one said group is being diverted to a different level, said pressure applying means comprising an oscillating tamper for intermittently engaging the uppermost surfaces of the articles in the rows to which pressure is applied.

3. Apparatus for processing parallel rows of articles, such as biscuits stacked on edge, comprising a separate conveyor for each said row having receiving and delivery ends, the receiving ends of a first group of alternate conveyors being at a different vertical level than the receiving ends of a second group of said conveyors and the delivery ends of said conveyors being at a substantially common vertical level and transversely spaced a greater distance than the transverse spacing of said receiving ends of the conveyors, whereby adjacent conveyors diverge toward the delivery ends thereof, each said conveyor comprising an endless belt, idler pulleys for supporting the receiving and delivery ends of the belt, said pulleys being in alignment with each other and with the reaches of the belt therebetween, and a drive pulley aligned with and drivably engaging the return reach of the belt, and means for driving said drive pulleys in unison.

4. Apparatus as defined in claim 3 comprising conveyor means for continuously advancing said rows of articles along a generally horizontal path, means for directing a first group of alternate rows to the receiving ends of said first group of conveyors and a second group of alternate rows to the receiving ends of said second group of conveyors, said last-named means comprising a stationary platform bridging said conveyor means and said separate conveyors and having transversely spaced ribs supporting said first group of rows, and means for applying downward pressure to said second group of rows to cause the same to enter the grooves between said ribs.

5. Apparatus as defined in claim 3, wherein each said conveyor further comprises a rigid rail supporting the upper reach of the belt between said idler pulleys, the rails for the uppermost conveyors being positioned as guides between the rows of articles on the lowermost conveyors at the receiving ends thereof.

6. Apparatus as defined in claim 3 comprising guide rods extending along opposite sides of the rows of articles on the uppermost conveyors, said rods being above the rows of articles on the lowermost conveyors at the receiving ends thereof and between adjacent rows of articles at the delivery ends of the conveyors.

7. Apparatus as defined in claim 3 wherein said means for driving said drive pulleys comprises a series of intermeshed gears mounted on parallel shafts extending generally in the same direction as but at acute angles to the axes of said drive pulleys and means including a universal joint connecting each said gear to a said drive pulley.

8. Apparatus as defined in claim 7 wherein said gears are driven by a common shaft to thereby rotate adjacent gears in opposite directions and wherein said drive pulleys are so engaged with said conveyor belts that the latter are all driven in a common direction.

9. Apparatus for processing parallel rows of articles, such as biscuits stacked on edge, comprising a separate conveyor for each said row having receiving and delivery ends, the receiving ends of a first group of alternate conveyors being at a different vertical level than the receiving ends of a second group of said conveyors and the delivery ends of said conveyors being at a substantially common vertical level and transversely spaced a greater distance than the transverse spacing of said receiving ends of the conveyors, whereby adjacent conveyors diverge toward the delivery ends thereof, each said conveyor comprising an endless belt, idler pulleys in alignment with the belt for supporting the receiving and delivery ends thereof and a drive pulley aligned with and drivably engaging the return reach of the belt, means for driving said drive pulleys in unison, conveyor means for continuously advancing said rows of articles along a generally horizontal path, means for directing a first group of alternate rows to the receiving ends of said first group of conveyors and a second group of alternate rows to the receiving ends of said second group of conveyors, said last-named means comprising a stationary platform bridging said conveyor means and said separate conveyors and having transversely spaced ribs supporting said first group of rows, and means for applying downward pressure to said second group of rows to cause the same to enter the grooves between said ribs.

References Cited

UNITED STATES PATENTS 2,545,667 3/1951 Malnati _____ 198—34
2,612,852 10/1952 Morrison _____ 198—34 X

FOREIGN PATENTS 1,152,914 9/1957 France.
819,212 9/1959 Great Britain.

EVON C. BLUNK, *Primary Examiner.*

M. L. AJEMAN, *Assistant Examiner.*